United States Patent [19]
Zakrajsek et al.

[11] Patent Number: 5,493,779
[45] Date of Patent: Feb. 27, 1996

[54] MOTION CONTROL SYSTEM

[76] Inventors: Viktor Zakrajsek; Roman J. Zakrajsek, both of 1035 Toy Avenue, Unit 2, Pickering, Ontario, Canada, L1W 3N9

[21] Appl. No.: 958,759

[22] Filed: Oct. 9, 1992

[30] Foreign Application Priority Data

Oct. 11, 1991 [CA] Canada .................................. 2053405

[51] Int. Cl.⁶ .................................................. G01B 5/00
[52] U.S. Cl. ............................................................ 33/1 M
[58] Field of Search .............................. 33/1 M, 609, 610

[56] References Cited

U.S. PATENT DOCUMENTS

| | | | |
|---|---|---|---|
| 3,764,900 | 10/1973 | Baldwin | 33/1 M |
| 4,372,223 | 2/1983 | Iwatani | 33/1 M |
| 4,527,119 | 7/1985 | Rogers et al. | 33/1 M |
| 4,680,868 | 7/1987 | Orr et al. | 33/1 M |
| 4,707,930 | 11/1987 | Sugiura et al. | 33/1 M |
| 4,779,348 | 10/1988 | Levy | 33/1 M |
| 4,852,267 | 8/1989 | Tezuka | 33/1 M |
| 5,063,676 | 11/1991 | Gerber | 33/1 M |

FOREIGN PATENT DOCUMENTS

| | | |
|---|---|---|
| 0195740 | 9/1986 | European Pat. Off. . |
| 336670 | 4/1959 | France . |
| 2642692 | 8/1990 | France . |
| 3336496 | 4/1985 | Germany . |
| 3716057 | 12/1988 | Germany . |
| 9011413 | 10/1990 | Germany . |
| 9015114 | 1/1991 | Germany . |

OTHER PUBLICATIONS

Catalogue No. 26E T H K Bearings Linear Motion Bearings by T H K Co., Ltd. Date Unknown.

*Primary Examiner*—Christopher W. Fulton
*Attorney, Agent, or Firm*—Neil H. Hughes; Ivor M. Hughes

[57] ABSTRACT

A gauging device for a metal working machine comprising two parallel hollow sections separated by a predetermined distance and having disposed therewith in use ball screw drives for each section having a pulley engaged with an endless belt, the endless belt (preferably a nylon covered steel core belt for example as manufactured by Breco-flex of Germany) driven by a separate servo motor having a second pulley engaged therewith, preferably the belt being engaged with an idler pulley on each side of the servo motor, whereby the one servo motor drives both ball screw drives each disposed with one of the two hollow sections. The center to center spacing of the ball drives is not as critical as with conventional known methods of linking drives, i.e. shaft and right angle gear box and drive shaft arrangements.

14 Claims, 6 Drawing Sheets

MOTION CONTROL SYSTEM

FIELD OF THE INVENTION

This invention relates to motion control systems for gauging a load in cooperation with a computerized numerical control device to a predetermined position whereat some further operation may be accomplished. The invention finds particular application in metal working machines such as brakes.

BACKGROUND OF THE INVENTION

Many forms of linear motion devices are known in the art. Examples of these devices are manufactured by Star GMBH of Sehweinfort in Germany which include a ball screw drive mounted in conjunction with a set of external guide rods which are provided with a frame, the guide rods guiding a carriage driven by the ball screw drive to a required position. Structures of this type are exemplified by the contents of FIG. 2. They are however heavy by nature because of the external mounting of the guide rails, exemplified by FIG. 2, thereby requiring that these guide rails be load bearing and thus relatively large in diameter.

Figure 4:
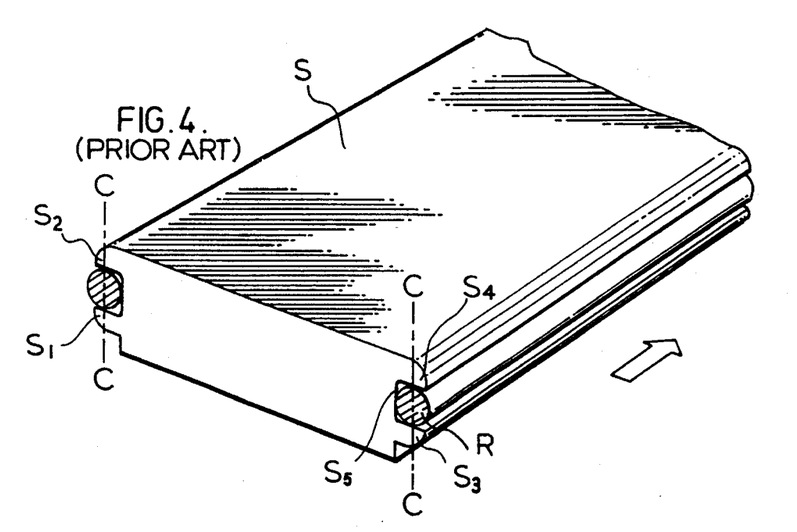
FIG. 4 is prior art to the instant invention

Another type of structure similar in operation to FIG. 2 is Manufactured by INA and includes a member as illustrated in FIG. 4 which includes guide rafts mounted externally on a section upon which a carriage will move. The guide rails are inserted in channels during manufacture and retained in position by passing the section shown in FIG. 4 past a stationary tool and rolling the flanges of the channels to retain the guide rails in position as described in FIG. 5.

The THK Co., LTD. of Tokyo Japan provides an LM Guide (a registered Trademark) to be incorporated in a linear motion device as described at pages 12 through 21 of their Catalog No. 26E. A guide rail of this generic type is incorporated in a device manufactured by Star GMBH in their catalogue for linear motion devices which describes an open top "U" shaped section having a guide rail of the form of the LM Guide therein, bolted in place within a machined channel at the bottom of the "U" shaped section. There is an inherent problem in the setup of such a guide as described at page 16 to 20 of the THK catalogue which requires extensive alignment procedures during the manufacture and setup of the unit. The use of this ball rail in linear motion devices is very expensive and results in complex installation procedures as described on pages 16 to 20 of the THK catalogue discussed above. For example the cost may be about $2000 per four meters of guide rail used in the device. A simpler, less time consuming, more cost effective solution is therefore very desirable.

Figure 8:
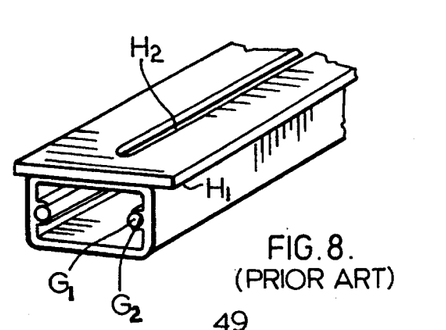
FIG. 8 is prior art to the instant invention.

Zakron Industries of Pickering, Ontario, Canada manufactures a CNC linear motion system for a shear which is constructed from an extruded section of aluminum. This aluminum section includes a substantially hollow hat section shape which is continuous in cross section, as illustrated in FIG. 8, which has a slot machined therein at the top thereof to allow gauging of a workpiece on a shear device such as Compu-Shear, a tradename of Zakron Industries. The section also includes channels for guide rails internally within the section as seen in FIG. 8. The guide rails are installed in the channels as shown in FIG. 8 by using any known technique so that the flanges on each side of the channel retain the guide rails in a similar manner as to that illustrated in FIG. 4 and 5. In use a carriage therefore runs internally within the section driven by a known ball screw drive such as those manufactured by THK. The Compu-Shear devices therefore offers the added reliability and safety of an enclosed system with out the need for bellows type covers or the like. However in spite of its many advantages over other known linear motion devices it is not always suitable for installations where space is at a premium, nor is it designed to resist any torque on the unit as a result of any material handling efforts of those using the unit, for example bumping by a material handling truck in a direction at fight angles to the direction of motion of the linear motion device.

Figure 2:
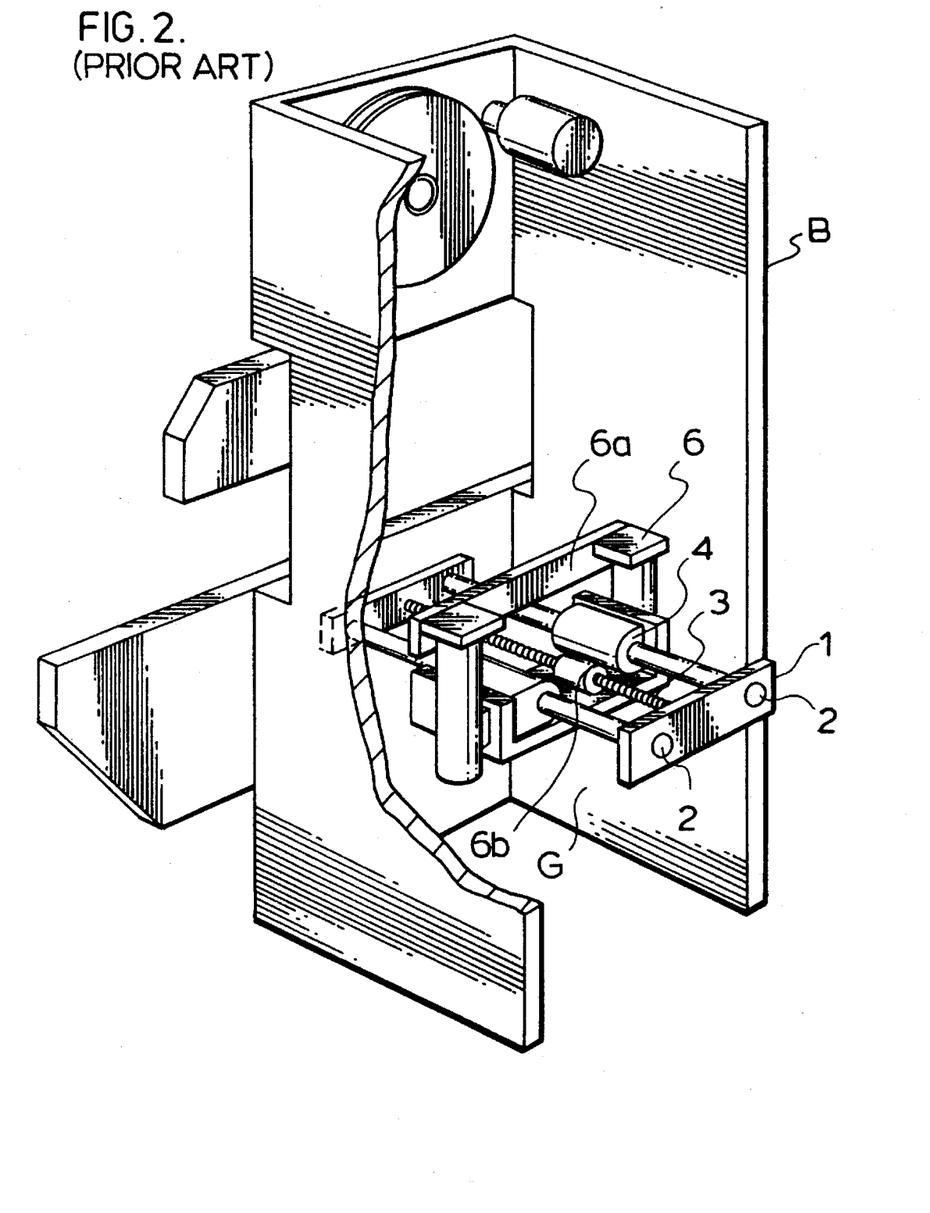
FIG. 2 is prior art to the instant invention.

Zakron Industries of Pickering, Ontario, Canada manufactures a CNC linear gauging system for a brake, which is constructed substantially as shown in FIG. 2, which may be provided integral with a new machine when manufactured, or which may be installed on an old brake thus bringing computerized numerical control gauging to older machines without the costly expense of purchasing a new brake. A new control for motion of the brake itself may or may not be provided. However the gauging system is heavy and requires extensive setup and alignment to ensure proper operation in the field. Therefore there exists a need for a more compact unit which reduces the amount of setup and alignment time required in manufacturing and installation is yet still compatible with the industry standard mounting distances of 200 mm, 400 mm, and 600 mm etc.

Nowhere within the prior art is there provided a compact closed section to be used with a gauging device, the external and internal walls of the compact closed section having formed therewith during manufacture the necessary details to provide strengthening of the section for torque resistance, recesses for the guide rails and corresponding recesses for a load carrying carriage, and allowance for the standard mounting distances for the units to which the gauging device will be mounted.

It is therefore a primary object of this invention to provide a gauging system which is economical to manufacture and operate while still offering the desired precision.

It is a further object of the invention to provide a gauging system which is safer to use and more reliable.

It is yet a further object of the invention to provide a gauging system which is significantly lighter in weight over the prior art structures.

It is yet still a further object of the invention to provide a gauging system which is easier to manufacture.

Further and other objects of this invention will become apparent to a man skilled in the art when considering the following summary of the invention and the more detailed description of the preferred embodiments illustrated herein.

SUMMARY OF THE INVENTION

According to one aspect of the invention there is provided a gauging device for a load to accurately position the load in relation to at least one axis of reference ( for example X, Y, R1 and R2, or Z1 and Z2) in relation to a predetermined position whereat a further operation for the load will be take place (such as bending), the gauging unit comprising a hollow continuous closed extruded section (for example in cross section), preferably manufactured from aluminum, the section being provided with details with the internal and preferably the external walls of the section, (for example cutouts, channels, reinforcing ribs and guide rail receiving portions), the details providing precision motion of a carriage within the section, the carriage beating the load to and from the predetermined position in relation to at least one axis of reference, the gauging device having driven means, for use in engagement with driving means at one end thereof (preferably a servo motor preferably having a pulley preferably driving an endless belt in communication with a driven pulley engaged with the ball screw), disposed within the hollow continuous closed extruded section (preferably a zero backlash ball screw drive, for example as those manufactured by THK or the like), the driven means engaged with the carriage and providing the movement thereof (preferably the driven means being aligned with respect to the gauging device by the extended ends of the guide rails retained in the guide rail receiving portions, the ends of the guide rails acting as doweling to align the end caps of the hollow continuous closed extruded section with respect to the section and thus aligning a predetermined positioning disposed with the end cap of the mounting of the driven means), preferably the carriage having disposed therewith means to engage the guide rails disposed within the section (preferably wheels and preferably four wheels, two being fixed in position with respect to the carriage and two being adjustable in position during manufacture to precisely set the reliable motion of the carriage).

In a preferred embodiment the gauging device further comprises two parallel hollow sections separated by a predetermined distance and having disposed with the preferred ball screw drives for each section a pulley engaged with an endless belt, the endless belt (preferably a nylon covered steel core belt for example as manufactured by Breco-flex of Germany) driven by a separate servo motor having a second pulley engaged therewith, preferably the belt being engaged with an idler pulley on each side of the servo motor, whereby the one servo motor drives both ball screw drives each disposed with one of the two hollow sections. The center to center spacing of the ball drives is not as critical as with conventional known methods of linking drives, i.e. shaft and right angle gear box and drive shaft arrangements.

In a preferred embodiment there is provided a low profile (preferably 2.5 inches in height) hollow extruded aluminum section designed for torque resistance to an external force for a gauging unit for a brake comprising a guidance system in use disposed within the hollow section, the section being provided with details with the internal and preferably the external walls of the section when manufactured, (for example cutouts (preferably on the sides of the section on the external wall for provision of the mounting of the section preferably at predetermined standard distances), channels (preferably for allowance of the space required to allow clearance within the low profile hollow section for rollers disposed with the carriage and or engaging portions for the channels disposed with the carriage, reinforcing ribs (preferably to reinforce the length of the section) and guide rail receiving portions to retain the guide rails in use), the details providing precision motion of a carriage within the section in use, the carriage bearing a load to and from a predetermined position in relation to at least one axis of reference for the brake in use.

BRIEF DESCRIPTION OF THE DRAWINGS

The invention will now be illustrated with respect to the following drawings illustrating embodiments of the invention in which.

DETAILED DESCRIPTION OF PREFERRED EMBODIMENTS OF THE INVENTION

Figure 1:
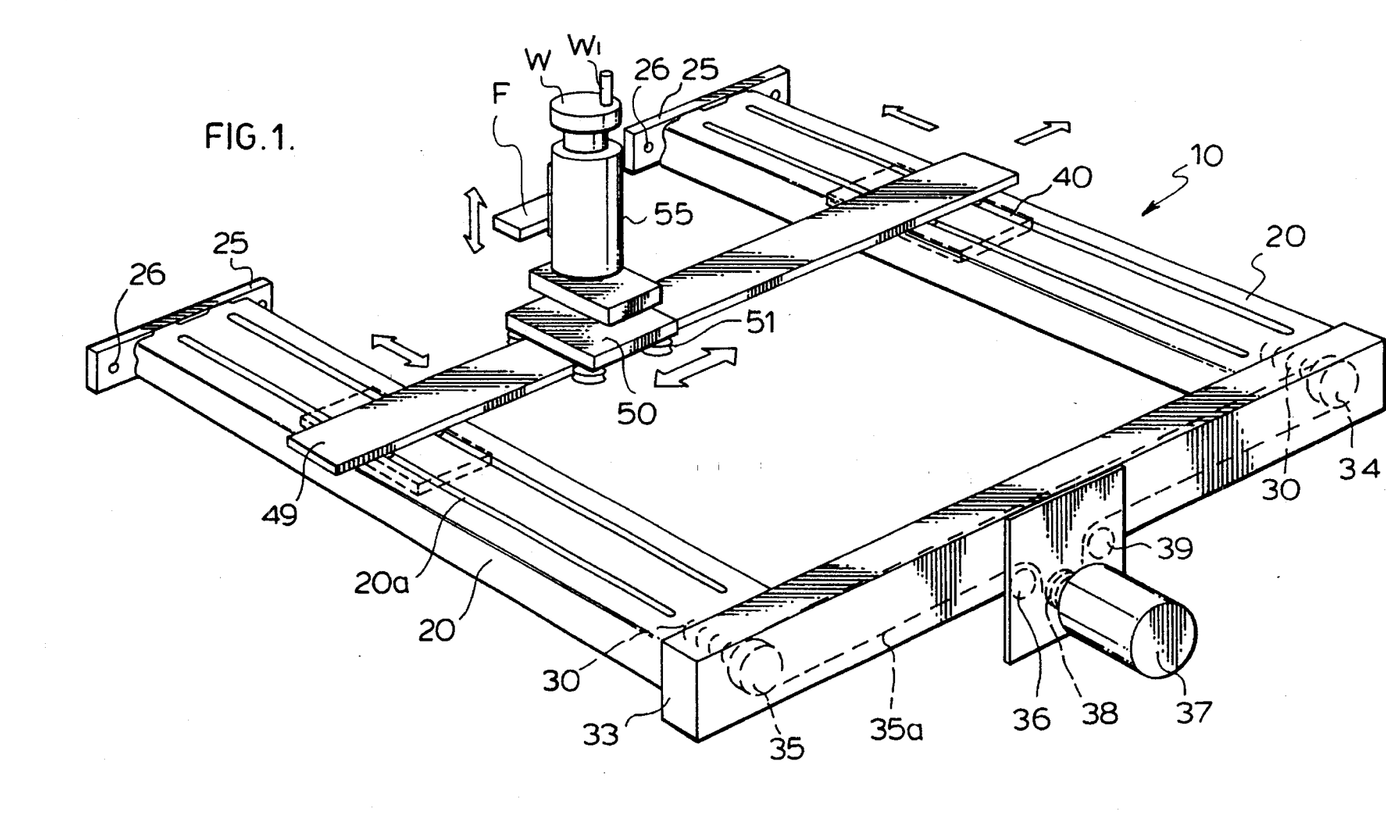
FIG. 1 is a perspective view of a gauging unit for a brake illustrated in a preferred embodiment of the invention.
Figure 3:
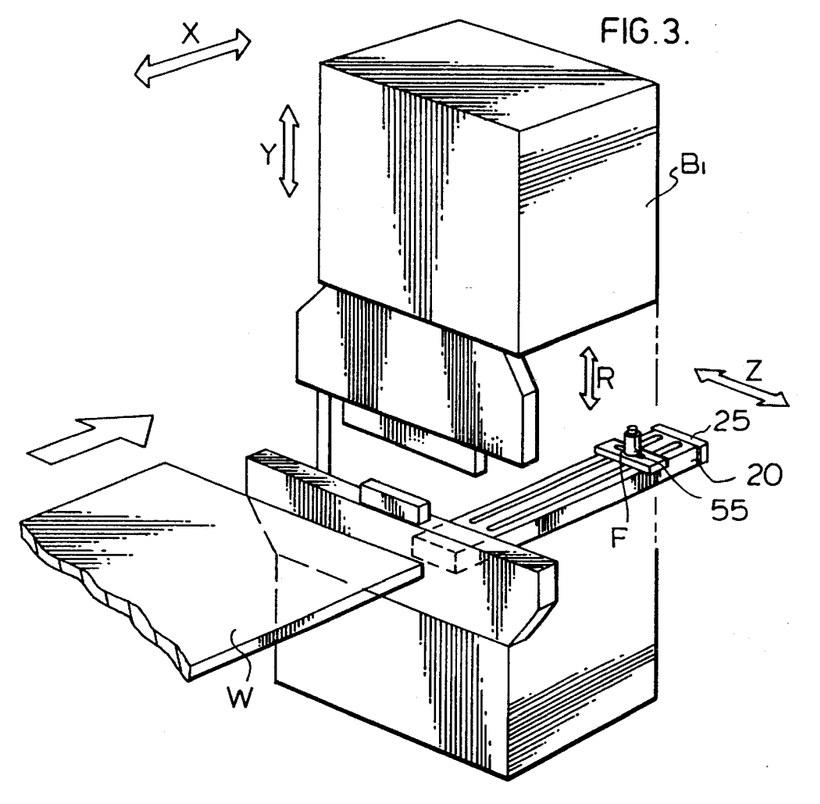
FIG. 3 is a perspective view of a brake having installed therewith a gauging device illustrated in a preferred embodiment of the invention.

Referring now to FIG. 1 there is illustrated a linear motion gauging device 10 for a brake unit (not shown) used for bending metal as required as exemplified by FIG. 3. The gauging unit 10 includes two gauging machines 20 manufactured from continuous closed hollow profiles substantially as shown and described in relation to FIG. 9. Each section 20 includes therein a zero backlash ball screw 30 having two ends. At the near end in the diagram there is disposed a pulley 35 which is driven by an endless belt 35a, a nylon covered steel core belt for example as manufactured by Breco-flex of Germany, driven by a separate servo motor 37 having a pulley 38 engaged therewith and 2 idler pulleys 39 provided to maintain the tension in the belt 35a at all times. The belt 35a therefore engages the pulley 34 of the screw 30, thus providing a mechanism 10 driven by one servomotor 37 which drives two systems simultaneously. A guard 33 is provide for the drive unit.

Figure 10:
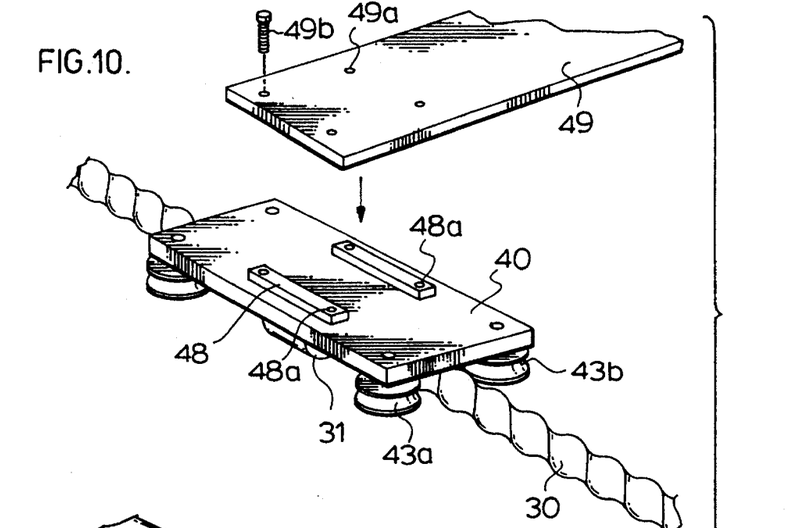
FIG. 10 is a perspective view of the carriage of FIG. 9 separated from the hollow section and showing the interconnection of the components of the gauging unit and illustrated in a preferred embodiment of the invention.
Figure 13:
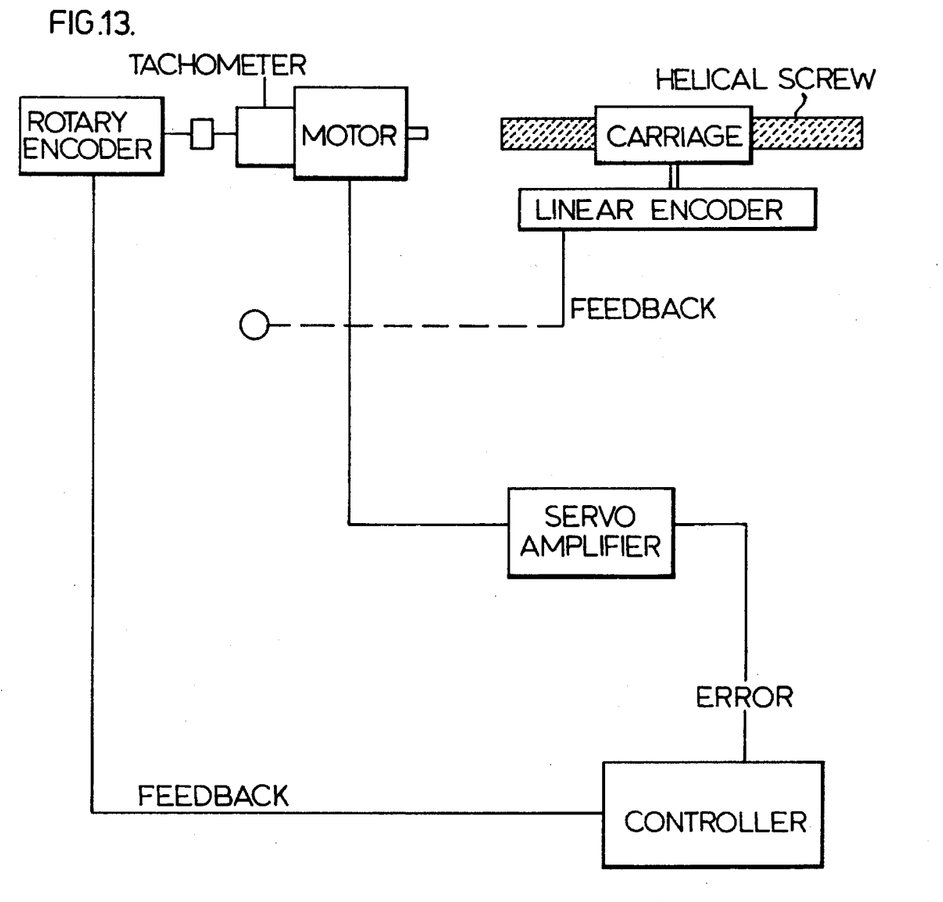
FIG. 13 is a schematic diagram of the servo motor and the control thereof illustrated in a preferred embodiment of the invention.

As best seen in FIGS. 1 and 10 the screw 30 drives the carriage 40 along the length of the machines 20 thereby positioning the portion 49 and hence the work piece at any desired location as predetermined by set points of a control mechanism exemplified and described schematically in relation to FIG. 13. The workpiece abuts the fingers F in use which may be raised and lowered by the rotation of the handle W1 of portion W of the height adjustment device 55 which is fully enclosed having no exposed parts to the environment. Therefore the workpiece is positioned automatically and retained in position by carriage 40, and positioned manually along portion 49 by an operator by moving unit 50 by wheels 51 to the desired location and then locking 50 in position and then adjusting the vertical height via unit 55. Alternatively the unit 55 may be driven by a servo motor and tied into the controller program. There are therefore few external portions of unit 10 which might injure a worker working around the unit, all of the moving components being safely contained within the hollow section 20. End caps 25 are provided as best seen and described in relation to FIG. 11. The portions 48 of FIG. 10 therefore engage the portion 49 through openings 49a and pins 49b into openings 48a in portions 48 through the slot 20a of machine 20.

Referring now to FIG. 2 there is illustrated a prior art structure for gauging a workpiece in relation to a brake. There is therefore provided a brake B having a gauging unit G disposed proximate the rear thereof. The unit G includes massive frame 6 and 6a to which is bolted a pair of retaining members 4 to guide the motion of the massive rods 2. The ball screw 3 driven in the conventional manner (not shown) drives through a connector 6b to the frame 6 thus driving the unit G. The unit G weighs about 200 pounds and requires during the manufacture thereof significant time on a alignment table to ensure the precision of the motion thereof.

Referring now to FIG. 3 there is illustrated a similar brake unit B1 to that illustrated in FIG. 2 wherein a machine 20 of FIG. 1 is substituted for the unit G of FIG. 2. The unit 20 includes a unit 55 with a finger F to abut the workpiece as previously described. However the machine 20 weighs about 25% of the unit G of FIG. 2 with no sacrifice in precision or abilities of the unit 20 as will be described hereinafter. By providing a lighter weight machine 20 the drive required to drive the unit is not as large thus saving power.

Referring now to FIG. 4 there is illustrated a known section S manufacture by INA. The section S has mounted therewith guide rails R to be used in a linear motion device. The guide rails R are retained in channels S5 by flanges S1, S2, S3, and S4 being rolled over the center line C—C of the guide rail R thus retaining the rail R in position. A work tool is used to accomplish this task which is mounted stationary and the section S is passed through the tool to roll the flanges S1 and S2 to capture the rail R. This method is known for external applications.

Referring now to FIG. 8 an aluminum section H1 includes a substantially hollow hat section shape which is continuous in cross section which has a slot H2 machined therein at the top thereof to allow gauging of a workpiece on a shear device such as Compu-Shear, a tradename of Zakron Industries. The section also includes channels G1 for guide rails G2 internally within the section as seen in FIG. 8. The guide rails G2 are installed in the channels G1 as shown in FIG. 8 by using any known technique so that the flanges on each side of the channel G1 retain the guide rails G2 in a similar manner as to that illustrated in FIG. 4 and 5. In use a carriage similar to that illustrated and described in relation to FIG. 9 therefore runs internally within the section driven by a known ball screw drive such as those manufactured by THK. The Compu-Shear devices therefore offers the added reliability and safety of an enclosed system with out the need for bellows type covers or the like. However in spite of its many advantages over other known linear motion devices it is not always suitable for installations where space is at a premium, nor is it designed to resist any torque on the unit as a result of any material handling efforts of those using the unit, for example bumping by a material handling truck in a direction at right angles to the direction of motion of the linear motion device.

Figure 5:
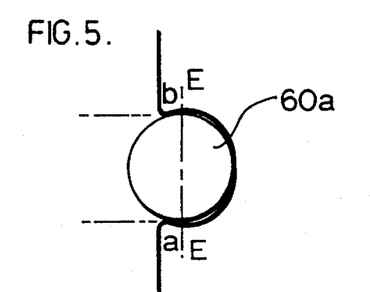
FIG. 5 is a close-up view in cross section of the guide rail and the method of retention thereof in the hollow section of the instant invention illustrated in a preferred embodiment of the invention.
Figure 6:
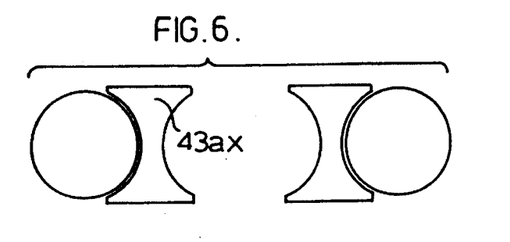
FIG. 6 is a close-up cross sectional view of the carriage and its motion within the section illustrated in a preferred embodiment of the invention.
Figure 7:
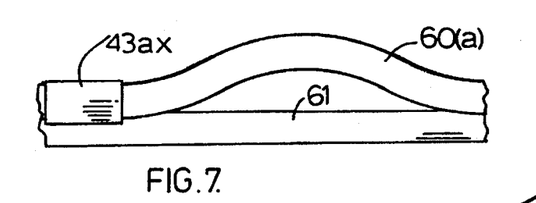
FIG. 7 is a schematic view of the method of alignment of the guide rails within the guide rail retaining portions of the hollow section illustrated in a preferred embodiment of the invention.
Figure 9:
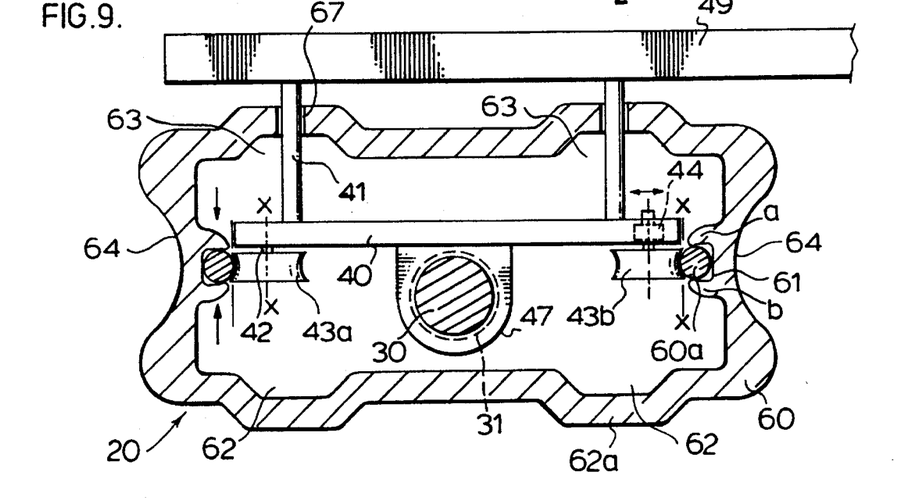
FIG. 9 is a cross sectional view of the preferred profile for the hollow extrusion of a gauging for a brake illustrated in a preferred embodiment of the invention.
Figure 12:
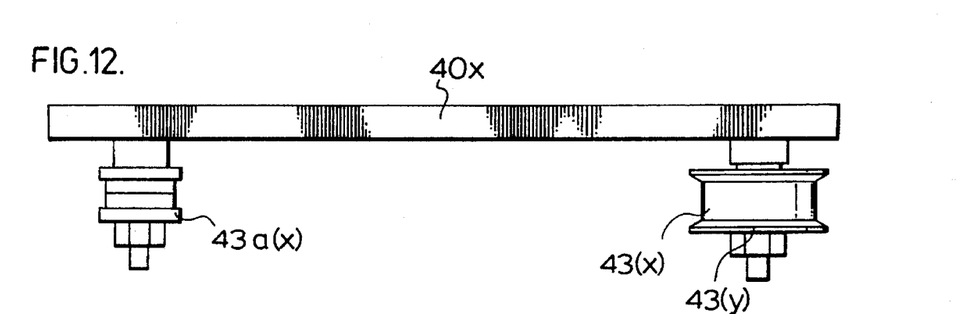
FIG. 12 is a cross sectional view of a tool used to align and retain the guide rails within the guide rail retaining portions of the hollow section during manufacture of the gauging unit and illustrated in a preferred embodiment of the invention.

Referring now to FIG. 5 a guide rail 60a is retained within a recess 61 of the unit of FIG. 9 in a similar manner to that of FIG. 4 and FIG. 8 with the exception that the rails 60a are installed with the help of a unit as illustrated and described in relation to FIG. 12. The rail 60a therefor is retained a point contacts 1, 2, and 3 at a tangent thereto, the points 1 and 3 being past the center line E—E of the Guide 60a.

Referring now FIG. 9 there is illustrated in cross section the machine 20 of FIG. 1. The machine 20 includes a low profile section 60 extruded from aluminum having formed during the extrusion process the portions 61 for the rails 60a, the ribs 62a for strengthening the section 60 longitudinally and recesses, 62 and 63 and to allow clearance for the wheels 43a and 43b, and the connectors 41 to portion 49 best seen in FIG. 1. Formed portions 64 are provided externally to allow minimum allowance of width of material for the section 60 while still allowing for the mounting of machine 20 to a metal working unit at industry standard mounting distances of 200 mm, 400 mm, and 600 mm etc. Without the portions 64 the Standards would be much more difficult to obtain.

The carriage 40 therefore travels along guide rails 60a by wheels 43a and 43b fore and aft at both sides of the carriage 40. The carriage 40 has disposed therewith four wheels, two 43a being fixed in position with respect to the carriage laterally and two 43b being adjustable in position laterally by setting the cam screw 44 during manufacture to precisely set the reliable motion of the carriage 40 and the separation of the wheels 43a and 43b to ensure point contact with the guide rails 60a. The cam screws are manufactured by INA of Germany.

The carriage 40 engages the screw 30 at portion 47 engaged with the ball portion 31 to drive the machine of FIG. 1 fore and aft, the carriage 40 bearing a load to and from a predetermined position in relation to at least one axis of reference for the brake in use.

Figure 11:
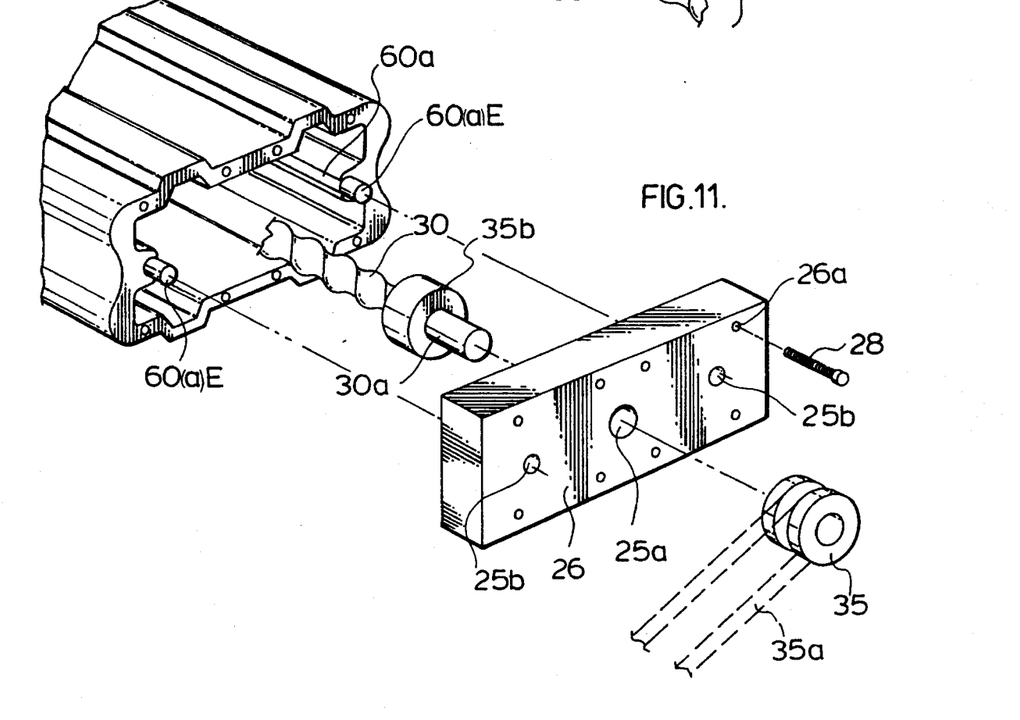
FIG. 11 is a close-up cutaway perspective view of the ends of the hollow profile and the interfit of the end caps thereof illustrated in a preferred embodiment of the invention.

Referring now to FIG. 11 there is illustrated the end portion 25 of FIG. 1 which end portion aids as a guide for aligning the screw 30 within section 60 of machine 20. The end cap 25 therefore includes openings 25b which are positioned to align with the extended ends 60aE of the guide rails 60a which extend in use into the openings 25b of end cap 25. In so doing by defining the position of the openings 25a for the beatings 35b of the screws 30 which in use is set laterally a predetermined amount from the rails 60a, then by establishing this equivalent known amount precisely in the end cap 25 at both ends of the machine 20 of FIG. 1, then the screw 30 will be automatically aligned. Of course as is illustrated the pulley 35 extends onto the end of the shaft 30a through opening 25a in use. This feature provides for the simplicity of manufacture of the machine 20.

Referring now to FIGS. 12 in conjunction to FIGS. 5, 6, 7, and 9 for ease of explanation there is described a tool 40x used during the manufacture of the machine 20 for installing the guide rails 60a precisely within the channels 61 in a manner similar to that described in relation to FIGS. 4 and 8 with the exception that the tool 40x has a set of forward wheels 43aX which when engaged with the rail 60a positions the rail properly within the channel 61 along the same path that the standard wheel 43a will travel and the rear wheel 43x includes rolling surfaces 43y which when the carriage 40x is driven through the section 60 rolls the flanges as lead by the wheel 43ax which positions the guide rail 60a vertically and precisely in channel 61 then the rolling surfaces 43y roll the flanges a and b toward one another past the center line E—E and thus capture the guide rails 60a in a precisely defined position as defined by the lead wheels 43aX.

Referring now to FIG. 13 there is illustrated in schematic view the preferred function of the controller for machine 20 of FIG. 1. The controller therefore is connected to servomotor 37 by conventional methods. The servomotor has coupled thereto a tachometer and rotary encoder. Alternatively the carriage 40 may have connected thereto a linear encoder. In either approach the precise positioning of the carriage 40 may be established by the feedback of the signal to the controller, comparing the signal provide to the reference set point, calculating the difference and amplifying the error calculated back to the motor or the carriage. The heart of the control system is a pair of 24 bit up/down counters which are summed to produce a digital error value. This is then translated via a digital to analog converter to provide the servo amplifier with an analog voltage which is proportional to the numerical difference of the two counters. The digital error value is updated at a rate of 50,000 times per second to ensure precision.

As many changes can be made to the invention without departing from the scope of the invention, it is intended that all material contained herein be interpreted as illustrative of the invention and not in a limiting sense.

The embodiments of the invention in which an exclusive property or privilege is claimed are as follows:

1. A gauging device for a load to accurately position the load in relation to at least one axis of reference (for example X, Y, R1 and R2, or Z1 and Z2) in relation to a predetermined position whereat a further operation for the load will take place (such as bending), the gauging device comprising a hollow continuous closed extruded section (for example in cross section), the section being provided with details with the internal and the external walls of the section, (for example cutouts, channels, reinforcing ribs and guide rail receiving portions), the details providing precision motion of a carriage within the section, the carriage bearing the load to and from the predetermined position in relation to at least one axis of reference, the gauging device having driven means, for use in engagement with driving means at one end thereof said driven means being disposed within the hollow continuous closed extruded section, the driven means engaged with the carriage; and providing the movement of said carriage, wherein the carriage has disposed therewith four wheels to engage rails disposed within the section, two wheels being fixed in position with respect to the carriage and two wheels being adjustable in position during manufacture to precisely set the reliable motion of the carriage.

2. The gauging device of claim 1 further comprising an additional hollow section disposed parallel to the original section and separated by a predetermined distance and having disposed therewith ball screw drives having centers for each section and a pulley engaged with an endless belt, the endless belt driven by a separate servo motor having a second pulley engaged therewith, whereby the one servo motor drives both ball screw drives each disposed with one of the two hollow sections.

3. The gauging device of claim 2 wherein the endless belt is a nylon covered steel core belt for example as manufactured by Breco-flex of Germany.

4. The gauging device of claim 3 wherein the belt is engaged with an idler pulley on each side of the servo motor.

5. The gauging device of claim 1 wherein the hollow continuous closed extruded section is manufactured from aluminum.

6. The gauging device of claim 1 wherein the driving means is a servo motor having a pulley driving an endless belt in communication with a driven pulley engaged with a ball screw.

7. The gauging device of claim 6 wherein the ball screw is a zero backlash ball screw drive, for example as those manufactured by THK.

8. The gauging device of claim 1 wherein the driven means is aligned with respect to the gauging device by the extended ends of guide rails retained in the guide rail receiving portions, the ends of the guide rails acting as doweling to align end caps of the hollow continuous closed extruded section with respect to the hollow continuous closed extruded section and thus aligning a predetermined positioning disposed with the end cap of the mounting of the driven means.

9. A low profile hollow extruded aluminum section designed for torque resistance to an external force for a gauging unit for a brake comprising a guidance system in use disposed within the hollow section, the section being provided with details with the internal and the external walls of the section when manufactured, (for example cutouts, channels, reinforcing ribs and guide rail receiving portions to retain the guide rails in use), the details providing precision motion of a carriage within the section in use, the carriage bearing a load to and from a predetermined position in relation to at least one axis of reference for the brake in use, wherein the carriage has disposed therewith four wheels to engage rails disposed within the section, two wheels being fixed in position with respect to the carriage and two wheels being adjustable in position during manufacture to precisely set the reliable motion of the carriage.

10. The low profile hollow extruded aluminum section of claim 9 wherein said section is substantially 2.5 inches in height.

11. The low profile hollow extruded aluminum section of claim 9 wherein cutouts are disposed on the sides of the section, on the external wall for provision of the mounting of the section at predetermined standard distances.

12. The low profile hollow extruded aluminum section of claim 9 wherein channels are provided for allowance of the space required to allow clearance within the low profile hollow section for rollers disposed with the carriage and engaging portions for the channels disposed with the carriage.

13. The low profile hollow extruded aluminum section of claim 9 wherein reinforcing ribs are provided in reinforce the length of the section.

14. The low profile hollow extruded aluminum section of claim 9 wherein cutouts are disposed on the sides of the section, on the external wall for provision of the mounting of the section at predetermined standard distances, wherein channels are provided for allowance of the space required to allow clearance within the low profile hollow section for rollers disposed with the carriage and engaging portions for the channels disposed with the carriage and wherein reinforcing ribs are provided to reinforce the length of the section.

* * * * *